United States Patent

[11] 3,530,791

| [72] | Inventor | Percy Flotte |
| | | 17040 Renton Blvd., Belleville, Michigan 48111 |
| [21] | Appl. No. | 721,283 |
| [22] | Filed | April 15, 1968 |
| [45] | Patented | Sept. 29, 1970 |

[54] ROTARY CIDER PRESS
5 Claims, 7 Drawing Figs.

[52] U.S. Cl. .................................................. 100/120, 100/152
[51] Int. Cl. .................................................. B30b 9/24
[50] Field of Search .......................................... 100/118, 119, 120, 151, 152, 153; 162/358, 360, 361

[56] References Cited
UNITED STATES PATENTS

| 457,217 | 8/1891 | Rohrer | 100/120X |
| 502,523 | 8/1893 | Lockstaedt | 100/120X |
| 555,429 | 2/1896 | Ecker | 100/120X |
| 602,620 | 4/1898 | Flory | 100/118 |
| 637,188 | 11/1899 | Wayland | 100/152 |
| 1,659,733 | 2/1928 | Harbeck | 100/120X |
| 3,110,244 | 11/1963 | Goodale | 100/120 |

*Primary Examiner*—Peter Feldman
*Attorney*—Edward M. Apple

ABSTRACT: This application discloses a rotary cider press. The invention resides in the particular combination and arrangement of parts. The invention device comprises a receiving station in which the fruit is first fragmented and from which it is discharged and deposited onto an endless belt of porous material. The belt is power driven and has means for folding its edges over the fruit while in motion to form a moving enclosure for the fruit, prior to its being received between pairs of power driven rollers, the latter being adjustable to provide varying degrees of pressure on the folded belt and its contents. The juice is pressed from the fruit by the fluted rollers and passes through the belt material into a collector basin from which it is withdrawn for use. The folded belt containing the relatively dry fruit pulp continues over other rollers to another station, where the belt is unfolded, after which it is then scraped clean of the fruit pulp which is discharged through a chute into suitable containers for disposition. The belt continues to travel over other rollers and returns to a position below the first station where it again picks up more fragmented fruit to repeat the cycle.

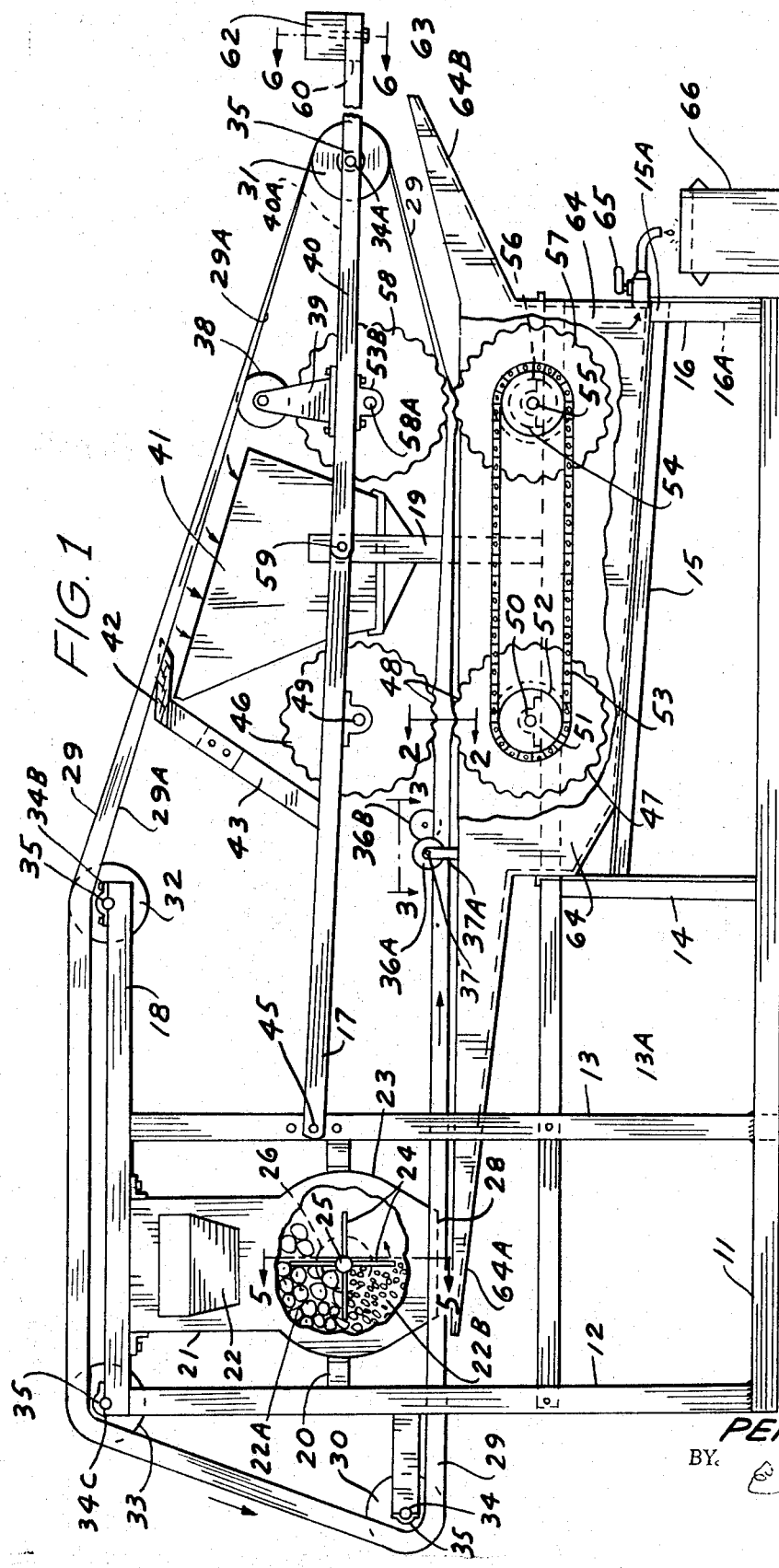
INVENTOR.
PERCY FLOTTE
BY Edward M. Apple
ATTORNEY

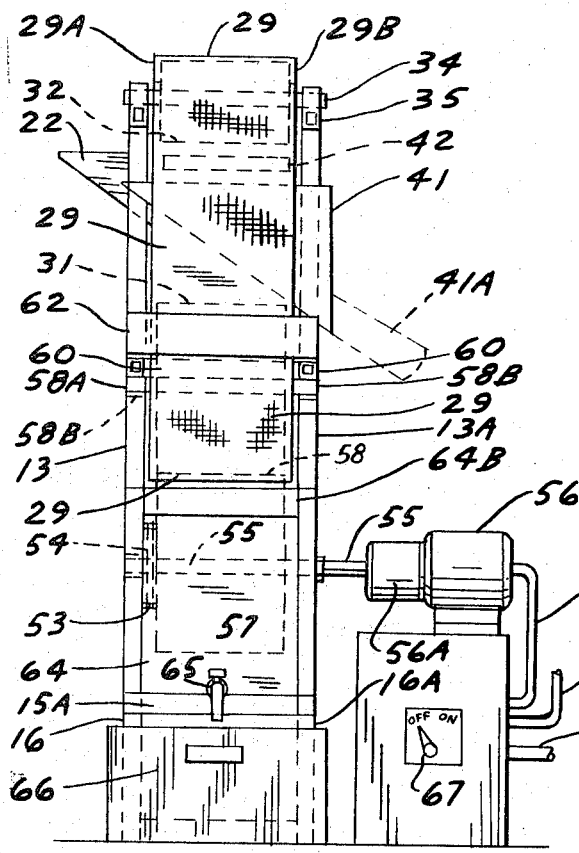
FIG. 7
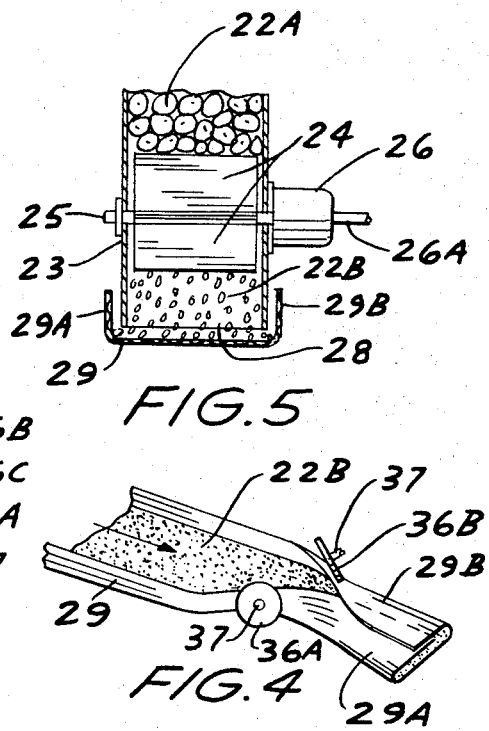
FIG. 5
FIG. 4
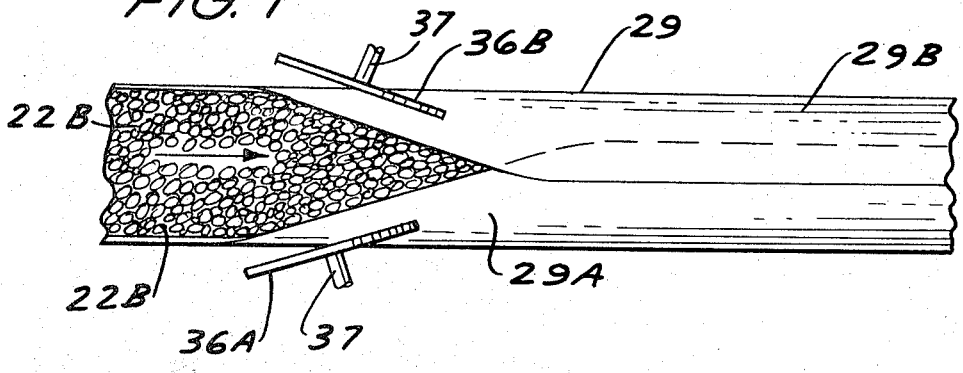
FIG. 3
INVENTOR.
PERCY FLOTTE
BY Edward M. Apple
ATTORNEY

ROTARY CIDER PRESS

This invention relates to the art of extracting the juice from fruit and has particular reference to a device for pressing apples for making cider.

An object of the invention is to generally improve cider presses and to provide a device of that nature which is simple in construction, economical to manufacture and efficient in operation.

Another object of the invention is to provide a device to produce a maximum of juice in a minimum of time.

Another object of the invention is to provide a continuously operating rotary cider press, which automatically produces instantaneously fresh juice in controllable volume.

Another object of the invention is to provide an automatic cider press with continuous flow characteristics which enables it to make cider with a minimum of manual operations.

Another object of the invention is the provision of a cider press which is self cleaning and one which will meet the highest standards of sanitation and health requirements.

Another object of the invention is the provision of a device of the character indicated which is constructed and arranged so that all of its working parts are readily accessible for repair or replacement.

Another object of the invention is to provide a device of the character indicated which is constructed and arranged wherein the juice may be extracted from apples with minimum of handling and with a minimum of manual labor.

Another object of the invention is to provide a device of the character indicated which may be power operated with a minimum of expense.

Another object of the invention is to provide a cider press which is compact in size, readily moved from place to place and one which may be maintained in maximum operating condition with a minimum of expense.

The foregoing and other objects and advantages of the invention will become more apparent as the description proceeds. Reference being made from time to time to the accompanying drawings forming part of the within disclosure, in which drawings:

FIG. 1 is a side elevational view of a device embodying the invention with parts broken away to show the relation of other parts.

FIG. 2 is a section taken substantially on the line 2–2 of FIG. 1.

FIG. 3 is a fragmentary, enlarged, plan view taken substantially on the line 3–3 of FIG. 1.

FIG. 4 is a fragmentary, perspective detail, illustrating the folding operation of the device shown in FIG. 1.

FIG. 5 is a section taken substantially on the line 5–5 of FIG. 1.

FIG. 6 is a section taken substantially on the line 6–6 of FIG. 1.

FIG. 7 is a right end elevational view of the device shown in FIG. 1.

Referring now more particularly to the drawings, it will be understood that in the embodiment herein disclosed, the reference character 11 indicates, in general, the supporting frame of the device, which consists of a number of vertical and transverse members, such as 12, 13, 13–A, 14, 15, 16, 16–A, 17, 18 and 19 all of which are lengths of angle iron, preferably secured together by means of welding, or another suitable means.

Supported on the frame 11, which includes a cross member 20 (FIG. 1), is a hopper-like member 21, which is preferably made of stainless steel and is provided with a filler chute 22, through which whole apples 22–A may be fed into the hopper 21. The hopper 21 has an expanded, depending portion 23, in which is mounted for rotation a hammer-mill 24. The hammer-mill 24 rotates with a shaft 25, which is driven by an electric motor 26 (FIG. 5) which is connected to a suitable source of electric power 27 (FIG. 7), through the lead 26–A. The lower end of the hopper 21, 23 (FIG. 1) is provided with an opening 28, which permits the fragmented apples 22–B to fall onto an endless belt 29, which is made of a porous material and which is arranged to pass over a plurality of supporting rollers 30, 31, 32 and 33. The rollers are mounted for rotation on suitable spindles 34, 34–A, 34–B and 34–C which rotate in suitable bearings 35 carried by the frame 11.

It will be understood that the belt 29 is substantially U-shaped, in cross section, as it passes over the rollers 30, 32 and 33 and is in a folded over, flattened, condition as it passes over the roller 31. The change in shape and condition of the belt 29 is effected by means of a pair of rotatable discs 36–A and 36–B (FIGS. 1, 3 and 4). The discs 36–A and 36–B rotate on suitable spindles 37 which are supported on brackets 37–A (FIG. 1). The discs 36–A and 36–B (FIG. 3) are angularly positioned, with respect to the travel of the belt 29, and the disc 36–A is positioned slightly ahead of the disc 36–B, so that it will fold over the edge 29–A of the belt 29 ahead of the folding of the edge 29–B of the belt by the disc 36–B. After the belt 29 (FIG. 1) passes over the roller 31, the sides 29–A and 29–B are caused to unfold, by means of a second pair of discs 38, which are positioned and function in a reverse manner to the discs 36–A and 36–B previously described. The discs 38 are mounted on suitable brackets 39, which are in turn mounted on a pivoted arm 40. The discs 38 are angularly positioned with respect to the flow of the belt 29 and are arranged to return the belt 29 to its original U-shaped, in cross section, condition before the belt 29 reaches the roller 32.

Mounted under the belt 29 (FIGS. 1 and 7) on a frame member 19, between the discs 38 and the roller 32, is a chute 41 which is arranged to receive and collect the fruit pulp remaining in the inverted belt 29, after the sides 29–A and 29–B have been unfolded by the discs 38. The fruit pulp collected in the chute 41 is deposited in a wagon bed, or other suitable container, through the chute extension 41–A, and may be disposed of in any suitable manner.

In order to remove all traces of the fruit pulp from the belt 29, I have provided a scraper 42, which is preferably made of maple, or other hard wood, or other suitable material. The scraper 42 is mounted at the end of a bracket 43, which is secured by welding, or other suitable means, to the member 17 comprising part of the frame. It will be noted that the scraper 42 is provided with a plurality of apertures 44, so that adjustment may be made between the scraper and the bracket 43. Similar apertures 45 are provided so that adjustment may be made between members 13 and 17.

The belt 29, having now been cleared of all of the fruit pulp residue, passes over the rollers 32, 33 and 30, with its edges 29–A and 29–B turned inwardly to form an inverted channel. After the belt 29 passes over the roller 30, it is in an upright, U-shaped, in cross section, channel shape, ready to receive the disintegrated apples 22–B from the hopper 21, 23. At the instant the disintegrated apples 22–B are received on the belt 29, the belt is in the form of a channel and after the sides of the channel are folded under one another, by means of the discs 36–A and 36–B, the belt 29 then becomes a moving, covered container for the previously disintegrated apples. The belt 29 containing the previously disintegrated apples 22–B first passes through a pair of pressure rollers 46 and 47, which are preferably made of hard wood, stainless steel, or other non-corrosive material. The outer peripheries of the rollers 46 and 47 are fluted as at 48. The pressure exerted between the rollers 46 and 47 effects a preliminary pressing of the fruit, 22–B which is held in the folded over belt. The rollers 46 and 47 are pivoted for rotation in suitable bearings 49 and 50. The roller 47 is driven through a sprocket 52 and a chain 53, which in turn is driven by a sprocket 54, which is mounted on the shaft 55, which in turn is driven by a motor 56 (FIG. 7) through a reduction gearbox 56–A. The motor 56 is connected through the lead 56–B, and the control box 56–C, to a suitable source of electric power 27.

The folded belt 29, and its contents, are finally passed between the pressure rollers 57 and 58, the peripheries of which are also fluted, as are the rollers 46 and 47. The roller 57 is mounted on the shaft 55 and is likewise driven by the motor 56. The roller 58 is mounted on a shaft 58–A, which rotates in bearings 58–B, mounted on the arm 40, which is pivoted as at 59. The roller 58 is mounted on the pivoted arm 40, so that different degrees of pressure may be exerted on the roller 57 and the belt 29.

The pivoted member 40 has an extension 60 (FIG. 1) which is provided at the free end with a weight 62, which is longitudinally adjustable on the extension 60, and is held in position by means of the machine screws 63. By moving the weight 62 on the extension 60, various degrees of pressure may be exerted on the belt 29 and roller 57 by the roller 58. The adjustment elements 45 serve a similar purpose, with respect to the pressure exerted by the roller 46. Although I show the rollers 46 and 58 as being idlers, it will be understood that they may be power driven, as are the rollers 47 and 57.

The juice extracted from the fruit in the folded belt 29, as it passes between the rollers 46, 47, 57 and 58, is collected in a receptacle 64, from which the juice may be withdrawn, through the valve 65, and be received in a container 66. The collector 64 has an extension 64–A which reaches a point below the hopper 21, and an extension 64–B which extends to a position below the roller 31, so that all of the juice may be received from the belt 29.

The device operates as follows: The motors 26 and 56 are first started by throwing the switch 67, shown on the control box (FIG. 7). This will cause the rotation of the hammer-mill 24 and the rotation of the rollers 47 and 57 and the movement of the belt 29. The belt 29 is caused to move at the rate of approximately 4 r.p.m., by reason of its impingement between the sets of rollers 46 and 47, 57 and 58. While the parts just described are in motion, whole apples 22, or other fruit, are dropped into the chute 22 and hence into the enlarged portion 23 of the hopper, where they are initially disintegrated, as at 22–B. The disintegrated apples 22–B then fall through the opening 28 onto the belt 29, which at this station is in the form of a U-shaped channel. The disintegrated apples 22–B are carried forward on the belt 29 to the disc stations 36–A and 36–B, where the sides 29–A and 29–B of the belt are folded over to cover the disintegrated apples 22–B. After the loaded belt 29 leaves the station of the discs 36–A and 36–B, the disintegrated apples 22–B will be initially pressed by the rollers 46 and 47. The belt 29 and its contents are then finally pressed between the rollers 47 and 58 to effect the final juice removal operation. The belt 29, with its pulp content fully relieved of all juice, then advances over the roller 31 to the disc station 38, where the sides 29–A and 29–B of the belt 29 are unfolded to permit the pulp residue to fall into the chute 41 and hence into a wagon or other container for disposal. Pulp remaining in the inverted belt 29 is removed by the scraper 42, as the belt advances from the disc station 38 to the roller 32. As the belt 29 passes over the roller 32 the edges 29–A and 29–B of the belt will extend over the ends of the roller 32. The belt 29 remains in this condition also as it passes over the rollers 33 and 30. After passing over the roller 30 the belt 29 again assumes the upright channel position for receiving another charge of the partly disintegrated apples 22–B from the hopper 23 and the cycle is repeated.

I claim:

1. In a rotary press, including an endless belt and pairs of adjustable pressure rollers, the improvement which consists of providing flutes on the peripheries of at least one pair of pressure rollers, and arranging said pressure rollers so that the flutes of one roller cooperate with the flutes of the other roller in the pair, to move said endless belt forward and prevent material carried on said belt from moving backwardly on said belt.

2. The structure of claim 1, including means spaced from said pressure rollers arranged to invert said endless belt, and adjustable scraper means for removing fruit pulp from said inverted belt after said belt has passed through said pressure rollers, and means to collect the fruit pulp which is scraped from said inverted belt.

3. The structure of claim 2 including means spaced from said pressure rollers arranged to form said belt into an inverted channel before said belt is scraped, and spaced rollers for supporting said belt in inverted channel form after it has been scraped.

4. The structure of claim 1, including disc means for folding over the edges of said belt before the said belt contacts said pressure rollers, fruit disintegrating means and a chute for charging said belt with disintegrated fruit at a station in spaced relation to said folding means.

5. The structure of claim 1, including a pair of rotatable discs positioned ahead of said pressure rollers and arranged to change said belt from a channel form to a three layered form, means to invert said belt, and a pair of rotatable discs positioned aft of said pressure rollers and arranged to change said belt from a three layered form to the form of an inverted channel.